UNITED STATES PATENT OFFICE.

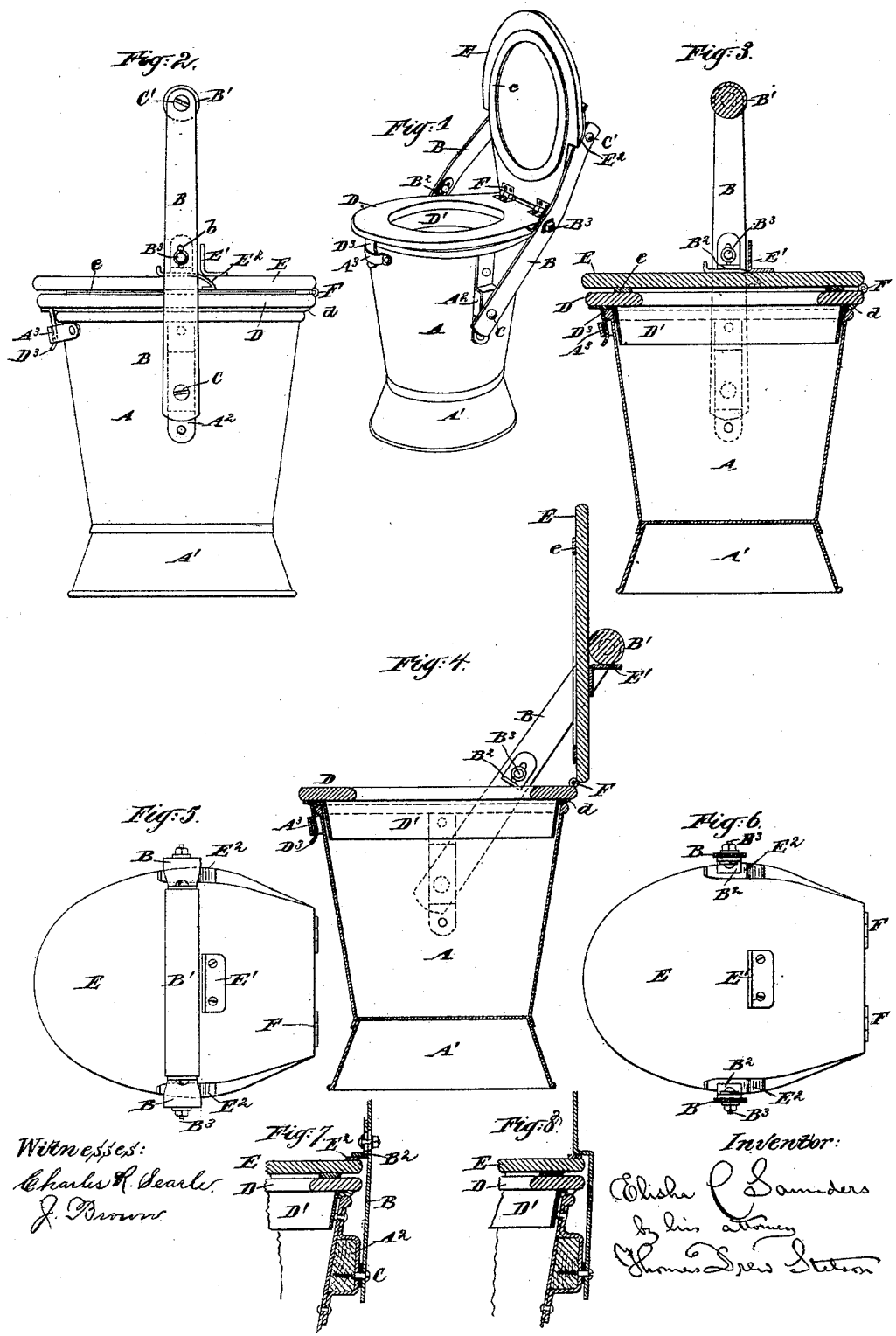

ELISHA C. SAUNDERS, OF WESTERLY, RHODE ISLAND.

COMMODE.

SPECIFICATION forming part of Letters Patent No. 459,148, dated September 8, 1891.

Application filed January 19, 1891. Serial No. 378,209. (No model.)

*To all whom it may concern:*

Be it known that I, ELISHA C. SAUNDERS, of Westerly, in the county of Washington and State of Rhode Island, have invented a new and Improved Commode; and I do hereby declare that the following is a full and exact description thereof.

The main body of the vessel may be made of sheet metal, as galvanized iron, and of a form approximating that of an ordinary slop-pail, but taller. It is equipped with a peculiar cover and with a bail, which, in addition to serving as a handle for transporting the vessel, serves in one position to hold the cover up in a position to serve as a back for the commode and in another position to hold down the cover, and by the aid of rubber or analogous packing attached to insure a tight fit.

The accompanying drawings form a part of this specification and represent what I consider the best means of carrying out the invention.

Figure 1 is a perspective view showing the commode in the open condition. Fig. 2 is a side view showing the commode in the closed condition. Fig. 3 is a central vertical section of the same. Fig. 4 is a similar view showing the commode open. Fig. 5 is a view from above. Fig. 6 is a plan view, partly in horizontal section. Fig. 7 is a vertical section of a portion at right angles to Fig. 3, and Fig. 8 is a similar view showing a modification.

Similar letters of reference indicate corresponding parts in all the figures where they appear.

A is the body of the vessel; A', a base or supporting-rim, and $A^2$ $A^2$ lugs, to which the bail B is secured by pivot-screws C. The bail is of flat iron or steel, forged or otherwise formed with slots $b$, through which are held brackets $B^2$ by the aid of screws $B^3$. The brackets $B^2$ have the effect of offsets. The top is a straight rolling handle B' held by pivot-screws C'. The handle B' and the offsets $B^2$ perform important functions, as will presently appear.

D and E indicate a double removable cover flexibly connected by butt-hinges F. The lower part D has a large oval opening, making it an approximately annular oval rim formed with a lip D', which extends down inside. The lower side of the cover D, exterior to the lip D', is faced with rubber $d$, adapted to fit tightly upon the upper edge of the vessel A. The upper cover E is continuous. Its lower side carries an oval ring of rubber $e$, making a tight joint between itself and the lower cover D when it is pressed down with sufficient force.

Near the middle of the back or upper side of the cover E is a bracket E'. When the bail is thrown backward to about an angle of forty-five degrees and the upper cover E is raised and turned backward to engage with it, the handle B' of the bail engages in the angle above the bracket E' and holds the upper cover E in about a perpendicular position. In this position the device is adapted to serve as a commode.

$E^2$ $E^2$ are cams riveted or otherwise firmly fixed in the position shown on the upper cover E, one on each side. They are slightly elastic, and the parts are so proportioned that when the upper cover E is lowered and the bail B is moved into the perpendicular position the offsets $B^2$ of the latter engage forcibly with the elastic cams $E^2$, and as the bail is moved strongly forward force the upper cover E strongly down upon the open cover or rim D. The same force transmitted downward also presses the lower cover or rim D firmly upon the smooth top of the vessel A. The rubber ring $d$ under the cover D is by this force compressed strongly upon the upper edge of the vessel A, and the rubber ring $e$ on the lower face of the upper cover E is by the same force pressed down strongly upon the lower cover D. The joints thus made are tight, and the vessel may be transported about the building, or may be allowed to stand any required period in a sick-room or in any other situation without allowing any odors to escape.

$D^3$ is a tongue extending downward from the front edge of the cover D and engaging in a keeper $A^3$ on the adjacent exterior surface of the vessel A. This tongue serves as an additional security to insure the holding of the parts in the correct position.

The covers D and E may be made of wood with proper allowance for the swelling effect of dampness; but I prefer to make them of papier-maché saturated with shellac or other moisture-proof material.

All the parts may be varied in form and material.

The removable character of the covers makes it easy to empty and thoroughly clean the vessel and all the parts.

The device is inoffensive to the senses and of great sanitary importance.

The brackets $B^2$, being held by the screws $B^3$ in the long apertures or slots $b$, may be shifted up and down to graduate the force with which the cams $E^2$ are urged downward; but some of the benefits of the invention may be attained without the adjustable quality, simply making fixed brackets $B^2$, or simply making offsets by sharply bending the bail at those points. Such a modification is shown in Fig. 8.

I claim as my invention—

1. The combination, with the vessel A, of the bail B, having offsets $B^2 B^2$, and the cover E, having cams $E^2 E^2$, arranged to receive the offsets, as herein specified.

2. The combination, with the vessel A, of the bail B, having offsets $B^2 B^2$, and the partial cover D, having a lip $D'$ matching upon and partially within the vessel, and the continuous cover E, having cams $E^2 E^2$, arranged to receive the offsets, as herein specified.

3. A vessel having the two covering devices D E hinged together, the continuous cover E having a bracket $E'$ and cams $E^2$, in combination with each other and with a bail B, having offsets $B^2$, arranged, as shown, so that the bail performs the triple functions of transporting the vessel, supporting the upper cover in the open position, and holding down both covers in the closed position, as herein specified.

4. In a commode with a tight cover having an elastic packing and suitable cams or bearing-surfaces, the bail B, having brackets or offsets $B^2$, adjustable by means of the screws $B^3$, adapted to allow the adjustment of the force with which the cover is held down by the bail, as herein specified.

5. The vessel A, hinged covers D E, and elastic cams $E^2$ on the latter, in combination with each other and with a hinged bail B, having offsets or brackets $B^2$, adjustable in height by the screws $B^3$, all arranged for joint operation, substantially as herein specified.

In testimony that I claim the invention above set forth I affix my signature in presence of two witnesses.

ELISHA C. SAUNDERS.

Witnesses:
HOBART C. SAUNDERS,
JOSEPH A. SCHOFIELD.